Aug. 12, 1952 W. V. BROWN 2,606,808
RECORDING APPARATUS
Filed July 18, 1946 2 SHEETS—SHEET 1
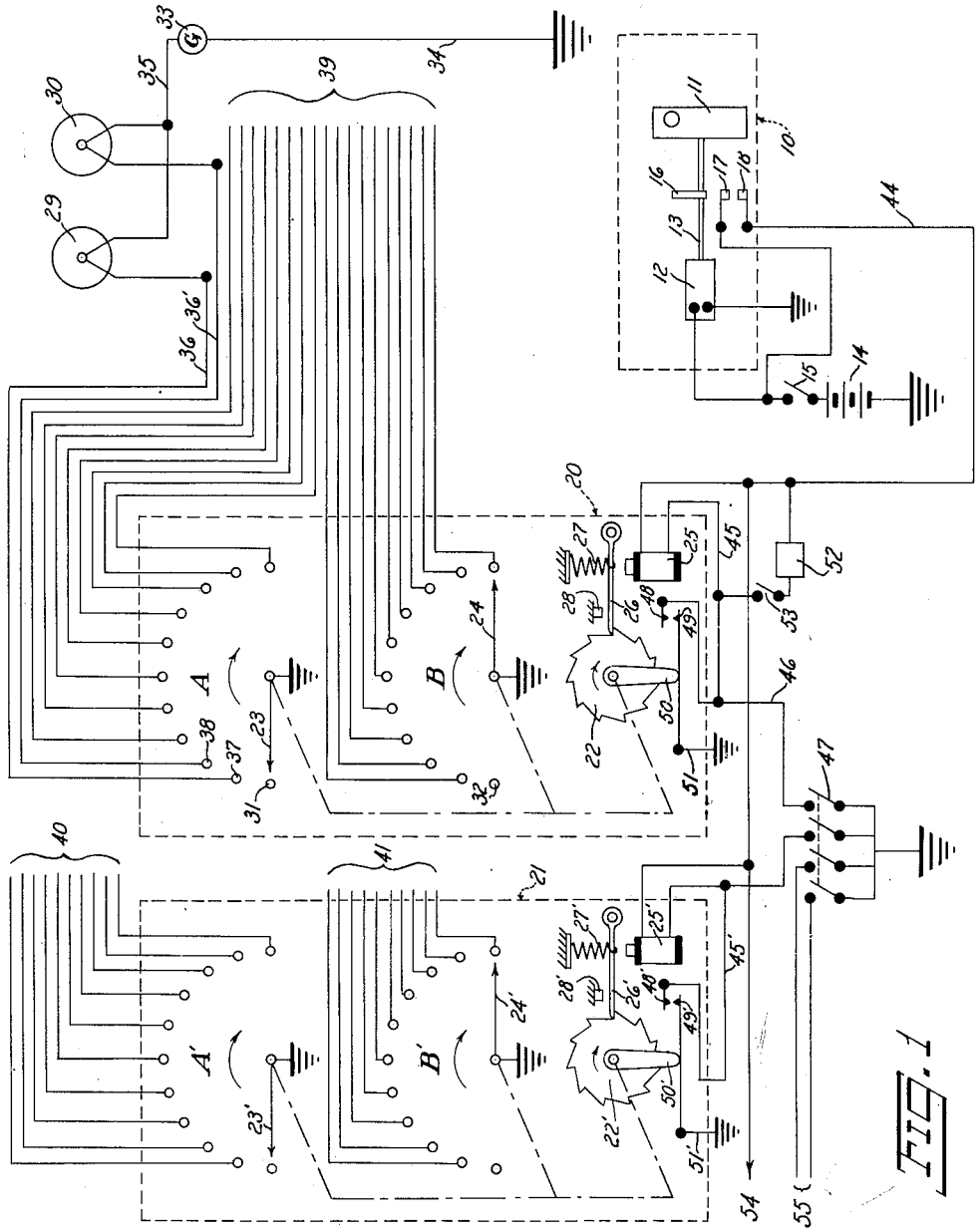
INVENTOR.
William V. Brown.
BY Charles S. Wilson
ATTORNEY.

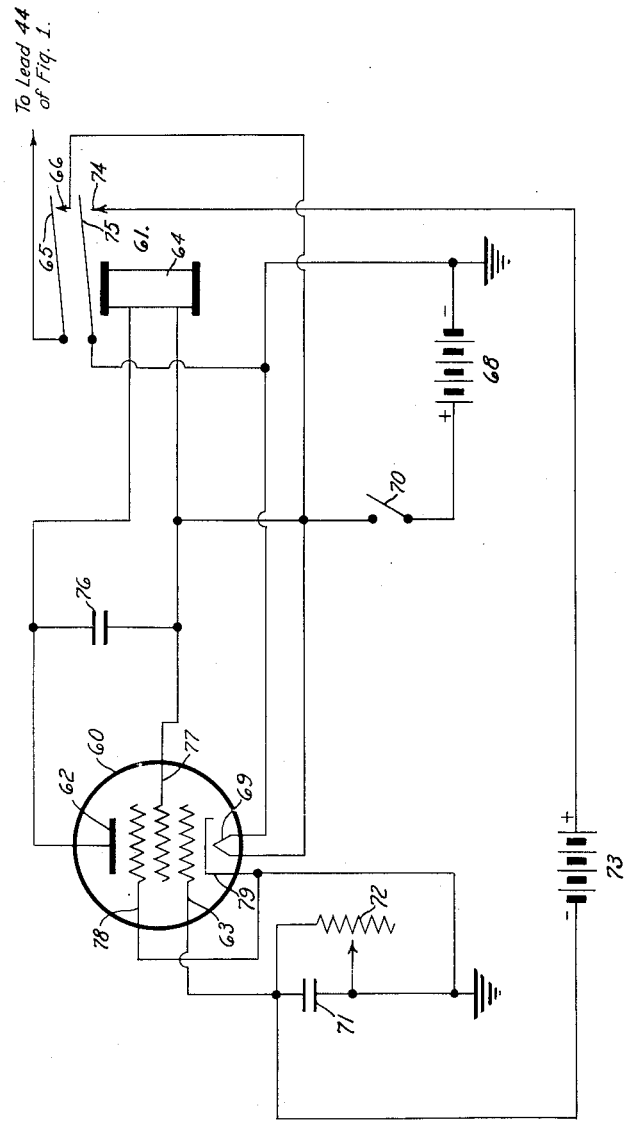

Patented Aug. 12, 1952

2,606,808

UNITED STATES PATENT OFFICE 2,606,808

RECORDING APPARATUS

William V. Brown, Flushing, N. Y., assignor to Republic Aviation Corporation, near Farmingdale, N. Y., a corporation of Delaware Application July 18, 1946, Serial No. 684,412

9 Claims. (Cl. 346—33)

This invention relates to recording apparatus and equipment which, while having many varied applications, is primarily designed for use in conjunction with aircraft whereby a relatively large number of operating characteristics such as engine temperatures, surface pressures, and the like, can be repeatedly measured and recorded during a single flight, and which recordings can, for all practical purposes, be considered to constitute continuous operating information during the period embraced by the said recordings.

In the testing of aircraft it is desirable, if not wholly essential, that extended tests be conducted, which among other characteristics and operating conditions include the determination of engine temperatures, surface pressures, air velocities at various points, etc. Since the determination of engine temperatures involves the disposition of thermocouples at many points throughout and around the engine structure itself, and since a great number of surface pressure and other readings are required, many test flights have heretofore been necessary to obtain complete operating data.

The present invention therefore has as one of its objectives, an apparatus whereby this multiplicity of measurements can be repeatedly and successively made and recorded during a single test flight which for all practical purposes comprises a continuous and simultaneous record of the many operating characteristics of the aircraft during the flight.

With the above and other objects in view, as will be apparent, this invention consists in the construction, combination, and arrangement of parts, all as hereinafter more fully described, claimed and illustrated in the accompanying drawings wherein:

Fig. 1 is a circuit diagram schematically disclosing the apparatus and associated circuits to successively connect the several measuring instruments with the recording indicators in accordance with this invention; and Fig. 2 is a circuit diagram of a vacuum tube pulsing device that may be employed in lieu of the mechanical pulsing device shown in Fig. 1.

Referring to Fig. 1, wherein separate units of the assembly are encompassed by broken lines, 10 designates generally a photographic recording unit for producing a permanent record of the measurements established by the several measuring instruments as will be described. Controlled by the photographic unit 10 are a number of identical selector switches 20 and 21 by which a series of measuring instruments may be sequentially connected to a single indicator or meter. In this form of the invention, a separate indicator 33 is provided for and individual to each selector switch to successively receive and record the measurements established by the instruments controlled by the switch. Although only two switches 20 and 21 are shown and described, any number may be employed and can, if desired, be connected in tandem, or any one switch may be provided with more than one series of contacts.

The recording unit 10 comprises a camera 11 driven by an electric motor 12 through the drive shaft 13, a suitable power source 14 and switch 15 being provided for the operation of the motor. The camera 11 in the instant form of the invention would be arranged to photograph an indicator panel having mounted thereon the indicators or meters 33 previously mentioned. For a detailed description of one means of photographically recording panels having a plurality of instruments mounted thereon, which is applicable to the present invention, reference is made to U. S. Patent #2,378,182 entitled "Photographic Recording Equipment." Rigidly fastened to the drive shaft 13, is a cam 16 adapted to operatively engage and actuate a switch including contacts 17 and 18, in synchronism with the movement of the film so that each successive set of readings registered on the several indicators or instruments will be photographically recorded on an individual film frame. A switching assembly of this type is fully described in the U. S. Patent 2,441,185 issued May 11, 1948 from copending application Serial Number #502,774 entitled "Camera Drive."

The selector switch 20 consists of a ratchet 22 mechanically coupled to the contact arms 23 and 24 operated 180° out of phase. The arms 23 and 24 respectively cooperate with the banks or series of contacts A and B to complete circuits successively through one series of contacts (A) and then through the remaining series (B) during one cycle of the ratchet 22. To rotate the ratchet 22 and the contact arms 23 and 24 coupled therewith, an electromagnet 25 operates a pawl 26 which engages the ratchet and advances it one notch or tooth upon each movement of the pawl by the energizing of the electromagnet 25. A spring 27 retracts the pawl 26 when it is released by the magnet 25 and a stop 28 limits the movement of the pawl 26 in the direction away from the magnet 25 so that the pawl will operate over but one tooth of the ratchet 22.

The selector switch 21 is identical to the switch 20 and therefore the same reference characters are applied to the elements thereof. Any number of switches 20 and 21 may be employed in a single assembly and each of the contacts of the banks or series A and B of each represents and is in circuit with a test station or instruments 29, 30, etc. and by engagement with the contact arm 23 or 24 electrically connects the station or instrument with the indicator or meter 33 associated with the switch. Manifestly the instruments 29, 30, etc. controlled by each switch should be similar and suitable to measure the same characteristics by substantially the same means. However, the nature and structure of the instruments 29, 30, etc. may change for each switch 20, 21, etc.: thus the instruments coacting with the switch 20 may measure or respond to temperature, while those coacting with the switch 21 may measure or respond to pressure, and so on ad infinitum.

An example of the instruments to be controlled by a switch are a series of thermocouples, two of which, 29 and 30, are shown to illustrate the manner in which a series thereof may be employed in conjunction with the switch. The particular switch 20 is provided with a total of twenty-two contacts, twenty of which are for the connection of thermocouples, individually and successively to the indicator 33. The two remaining contacts, 31 of series A and 32 of series B, are not used in this adaptation of the type of switch shown to so connect the couples to the indicator and are dormant in order to prevent simultaneous connection of two thermocouples to a single indicator. As a practical matter so far as the operation of the switch to connect thermocouples to the indicator is concerned, these contacts 31 and 32 may be eliminated.

The indicator or recorder may comprise the galvanometer 33, calibrated in terms of temperature, and be connected through lead 34 to ground and lead 35 to the common side of the thermocouples 29, 30, etc. the remaining sides of the individual thermocouples being individually connected respectively through leads 36, 36', etc. to the contacts 37, 38, etc. of the selector switch 20. The remaining contacts of series A and series B of the switch 20 are connected through leads, designated by 39, to additional thermocouples, not shown, in precisely the same manner as previously discussed relative to thermocouples 29 and 30, the other side or terminal of each of such thermocouples being returned to the common lead or bus 35. With the aforesaid arrangement, each individual thermocouple circuit is successively completed through the ground during rotation of the contact arms 23 and 24.

The second selector switch 21, as well as other like switches, may be connected in tandem with the switch 20 to the end that additional switches may be employed all operating in unison to connect the instruments (29, 30, etc.) associated with each switch to their indicator or recorder. In conjunction with the switch 21, the leads 40 and 41 are connected to a second set of thermocouples or other instruments to be connected by the contact arms 23' and 24' to ground and to a galvanometer or other indicator or recorder.

In operation of the apparatus heretofore described, the switch 15 is first closed to energize and produce rotation of the camera drive motor 12. Thereupon the cam 16, secured to the drive shaft 13, will actuate the switch contacts 17 and 18 to intermittently complete an electric circuit from the battery 14 through switch 15, lead 44, electromagnet 25, leads 45—46, and the closed switch 47 to ground for return to the battery 14. From the foregoing it becomes apparent that each successive completion of this circuit energizes the electromagnet 25 and thereby produces intermittent rotation of the ratchet 22 and the contact arms 23 and 24 mechanically coupled therewith.

The switch 47, a synchronizing switch for use when two or more selector switches are employed, enables positive synchronization of the several switches (20, 21, etc.) and facilitates absolute correlation of the galvanometer readings with the associated thermocouples or other measuring instruments. To this end, therefore, contacts 48 and 49 and a cooperating cam 50 fixed to the ratchet 22 for rotation therewith are provided for switch 20 and a similar cam and contact assembly is provided for each additional switch connected in tandem with the switch. Assuming that cam 50 is in a position other than that illustrated in the drawing, and that switch 47 is in the open position, the pulsing circuit through lead 44 to magnet 25, will be completed through lead 45, contacts 48 and 49 and lead 51 to ground. The selector switch ratchet 22 will therefore be rotated as heretofore described until the cam 50 reaches the position illustrated, whereupon the contacts 48 and 49 will be opened and no further rotation of the ratchet will take place. Since switch 21, as well as all other similar switches in the assembly, operates in precisely the same manner as switch 20, it too will continue to operate in response to the pulsing circuit until its control contacts 48' and 49' are opened by cam 50'. When all switches of the assembly have stopped operating, switch 47 can be closed and both selector switches will then operate in unison and in synchronism. The switch 15 is in effect a starting switch in that it initiates the operation of the motor 12 and thereby the impulses for the ultimate operation of the switches 20, 21, etc. When this switch 15 is closed and the switch 47 is open the switches 20, 21, etc. automatically become synchronized as above described and upon synchronization cease operation. Upon the completion of the synchronization of the switches 20, 21, etc. as aforesaid, the switch 47 may be closed whereupon the switches 20, 21, etc. begin synchronized operation in unison. To this extent the switch 47 may be said to be a synchronizing switch.

Functioning in addition to the synchronizing switch 47 in correlating the reading of the several indicators or recorders 33 an electromagnetic counter 52 is connected through a switch 53 to the leads 44 and 45 of the pulsing circuit to record each electrical impulse over the circuit. This counter 52 is mounted on the instrument panel with the indicators or recorders 33 and has a range of numbers at least equivalent to the number of contacts in the series A and B of each switch, so that each photographic record will include a counter number designating the particular contact of each switch operative in the production of that record and therefore the particular instrument 29, 30, etc. connected to the indicator or recorder 33 at that moment.

From the foregoing it is apparent that any number of selector switches may be employed in an assembly and for each additional switch a lead 55 is provided while a lead 54 comprises a continuation of the lead 44 and is common to those additional switches. The switch 47 has provision for only four selector switches, but additional switch contacts of course can be added to accommodate any number of selector switches.

The operation of the equipment after the installation has been completed and the camera positioned to photograph the readings of the indicators or recorders 33 and of the counter 52 may be summarized as follows: switches 47 and 53 are opened and switch 15 is closed, whereupon the rotation of motor 12 and shaft 13 will be initiated to operate cam 16 and camera 11. The cam 16 periodically closes contacts 17 and 18 to complete the selector switch circuits and cause rotation of the selector switch ratchets 22, 22', etc. Since the cams 50 and 50' rotate by and with their associated ratchets 22 and 22', the preliminary rotation of the selector switches will continue until the cams reach the starting position shown in the drawing, whereupon the contacts 48—49, 48'—49', etc. associated with each of said cams are opened to interrupt the circuits of the relays 25, 25' etc. associated with the respective selector switches and arrest the rotation of these switches. When all switch circuits have been interrupted as described and the switches therefore synchronized, the counter 52 is set at its starting point. Thus the readings of the indicators 33 are correlated in the photographic record with the designations of the particular thermocouples producing the readings. When the switch 53 is closed to complete the counter operating circuit and the switch 47 is closed to complete each of the selector switch operating circuits to ground all of the switches 20, 21, etc. then rotate in unison each to successively connect the several instruments 29, 30, etc. associated with the switch to the cooperating indicator or recorder 33 so that the measurements produced by the instruments may be simultaneously recorded and identified photographically.

In Fig. 2 is disclosed a modification of the present invention which resides in the means by which the impulses for the operation of the switches 20, 21, etc. are generated. Here the contacts 17 and 18 and the cam 16 associated with the drive of the camera 11 are replaced by a vacuum tube oscillator. This particular oscillator employs a tube 60 having a relay 61 connected with both the plate 62 and the grid 63 to produce cyclic operation of the relay. This cyclic operation or oscillation is transmitted to the selector switches 20 and 21 through the action of contacts 65 and 66 of the relay 61 to periodically connect battery 68 to lead 44 and produce periodic rotation of the ratchets 22 and 22' in precisely the manner attained by the action of cam 16 and contacts 17 and 18 of the camera mechanism 10.

Specifically, the oscillator circuit employs a pentode vacuum tube having a heater type filament 69 connected through an "on-off" switch 70 to battery 68, one side of said battery being connected to ground. The grid or control circuit of the tube 60 consists of the control grid 63 connected to ground through a condenser 71 in parallel with an adjustable resistor 72. A second control grid circuit including the grid 63, comprises a batery 73 in series with the relay contacts 74 and 75 to ground. The plate or output circuit of the tube 60, as previously described, includes the plate 62, in series with the relay coil 64 which is in parallel with condenser 76, the switch 70 and the battery 68 to ground. The screen grid 77 is also returned to ground through switch 70 and battery 68. Since, in this instance, grid voltages are applied directly to the grid 63, both the suppressor grid 78 and the cathode 79 are connected directly to ground.

To initiate the operation of this device, the switch 70 is closed and battery voltage is thereby applied to both the filament 69 and the plate 62. Since the relay contacts 74 and 75 are open, and the condenser 71 in the grid circuit is discharged, the grid 63 will be at zero potential with respect to the cathode 79. Under this condition, the tube 60 will draw plate current through the relay coil 64 actuating the relay 61 to close contacts 65—66 and 74—75, and charging the condenser 76. The closing of contacts 74—75 will complete the grid circuit from the grid 63 through battery 73 to ground, and thereby apply a negative voltage on grid 63. This negative bias will reduce the plate current in the tube 60 and de-energize the relay coil 64. However, since the condenser 76 has been charged to a voltage equivalent to the drop across the coil 64, the relay contacts will not open until the condenser discharges, through the coil 64, to a value below the critical operating voltage of the relay, this time delay being a direct function of the product of the capacity of condenser 76 and the resistance of the coil 64. Upon discharge of the condenser 76, the relay contacts will open and interrupt that portion of the grid circuit through battery 73. However, the condenser 71, during the time the contacts 74 and 75 have been closed, has assumed a charge equivalent to the voltage of battery 73, and therefore upon opening of the contacts 74 and 75, the grid 63 will continue to remain at a negative voltage until such time as the resistor 72 discharges the condenser to a point where the tube draws sufficient plate current to actuate the relay and repeat the cycle. The time delay of the grid circuit is also a function of the values of the condenser and the resistor included therein.

In actual operation of this device in combination with the selector switches, the pulsing circuit for the operation of the switches is completed from the battery 68 through contacts 65—66 and lead 44. The plate circuit time constant or delay, determined by the capacity of condenser 76 and the resistance of coil 64, is adjusted to provide a pulse of sufficient length to insure positive operation of the selector switches. The time delay in the grid circuit, adjustable by varying resistor 72, is regulated to allow sufficient time for reading all instruments before the cycle is repeated and the selector switch arms 23 and 24 are transported to the next successive contact.

What is claimed is:

1. An apparatus for recording a multiplicity of measurements comprising a plurality of series of measuring instruments, the instruments of each series responding to like characteristics, an indicator associated with each series, a rotary switch having a bank of contacts and a contact arm for each series of instruments, electromechanical means for transporting the contact arms of the said rotary switches for successive coaction with their banks of contacts, electrical connections between each series of instruments and the bank of contacts of its switch, an electrical connection between the contact arm of each switch and the associated indicator, whereby measurements originating with the several instruments of a series may be successively and repeatedly transmitted to the indicator, means for operating said electro-mechanical means, a cam operated switch controlled by each rotary switch, and electrical circuits including a synchronizing switch operably common to all rotary switches and the cam operated switch of each rotary switch and the electro-mechanical means aforesaid for synchronizing the initiation of the rotary movement of the said rotary switches.

2. An apparatus for obtaining a substantially simultaneous and continuous record of operating data of a mechanism comprising a plurality of series of testing instruments, an indicator associated with each series responsive to the several instruments of the series when individually connected therewith, an electro-magnetic switch assembly individual to each series of instruments for successively and repeatedly connecting the instruments thereof with its associated indicator, a power source, camera for simultaneously photographing all of the indicators at periodic time intervals, driving means for operating the camera, and means for simultaneously operating all of said switch assemblies in synchronism with said camera including a switch operated by the driving means of the camera for periodically connecting the power source to all of the switch assemblies.

3. An apparatus for recording flight characteristics of an airplane comprising a plurality of series of measuring instruments, the instruments of each series being adapted to measure the same characteristic and the several series being capable of the measurement of different characteristics, an independent indicator associated with each series, a step-by-step switch for each series organized and arranged to individually and sequentially connect each instrument of the series with the indicator of that series, means for simultaneously recording the readings of all of the indicators at periodic time intervals, means for advancing all of said switches in unison and synchronism with the operational time intervals of said recording means, and means to initially synchronize all of said switches to corresponding starting points.

4. An apparatus for recording flight characteristics of an airplane comprising a plurality of series of measuring instruments, the instruments of each series being adapted to measure the same characteristic and the several series being capable of the measurement of different characteristics, an independent indicator associated with each series, a step-by-step switch for each series organized and arranged to individually and sequentially connect each instrument of the series with the indicator of that series, means for simultaneously recording the readings of all of the indicators at periodic time intervals, operating means for advancing all of said switches in unison and in synchronism with the operational time intervals of said recording means, and means controlled by the operating means aforesaid to initially synchronize said switches to corresponding starting points.

5. An apparatus for recording flight characteristics of an airplane comprising a plurality of series of measuring instruments, the instruments of each series being adapted to measure the same characteristic and the several series being capable of the measurement of different characteristics, an independent indicator associated with each series, a step-by-step switch for each series organized and arranged to individually and sequentially connect each instrument of the series with the indicator of that series, means for simultaneously recording the readings of all of the indicators at periodic time intervals, means for advancing all of said switches in unison and in synchronism with the operational time intervals of said recording means, identifying means automatically operable in conjunction with said advancing means whereby each recording of the readings of said indicators may be distinguished from every other recording, and means controlled by the advancing means aforesaid to initially synchronize said switches to corresponding starting points while said identifying means remains inoperative.

6. An apparatus for recording flight characteristics of an airplane comprising a plurality of series of measuring instruments, the instruments of each series being distributed to critical areas of the airplane and adapted to measure the same characteristic, an independent indicator associated with each series, a step-by-step switch for each series organized and arranged to individually and sequentially connect each instrument of the series with the indicator of that series, means for simultaneously recording the readings of all of the indicators said recording means being operable at periodic time intervals, a relay individual to each switch and operatively connected to impart a predetermined advance to said switch upon each operation of the relay, all of said relays being electrically connected in parallel, pulsing means in circuit with the relays and synchronized with and controlled by said recording means to operate said relays in unison at each time interval, and means associated with the relays and coacting switches to initially position the latter at corresponding starting points.

7. An apparatus for recording flight characteristics of an airplane comprising a plurality of series of measuring instruments, the instruments of each series being distributed to critical areas of the airplane and adapted to measure the same characteristic, an independent indicator associated with each series, a step-by-step switch for each series organized and arranged to individually and sequentially connect each instrument of the series with the indicator of that series, a camera for photographically and simultaneously recording the readings of all of the indicators, means for operating said camera at periodic time intervals, a relay individual to each switch and operatively connected to impart a predetermined advance to said switch upon each energization of the relay, all of said relays being electrically connected in parallel, electrical means to impress impulses on the relay circuit, synchronized with and controlled by the operating means of the camera whereby an impulse is impressed on said circuit for each optional time interval of the camera, a pair of closed contacts in series with each relay and said electrical means, a cam driven by each switch to open said contacts at a given point with reference to said switch and thereby break the circuit through the relay, and means to connect all of the relays directly to said electrical means after the cams of the several switches have opened their cooperating contacts.

8. An apparatus for recording flight characteristics of an airplane comprising a plurality of series of measuring instruments, the instruments of each series being distributed to critical areas of the airplane and adapted to measure the same characteristic, an independent indicator associated with each series, a step-by-step switch for each series organized and arranged to individually and sequentially connect each instrument of the series with the indicator of that series, means for simultaneously recording the readings of all of the indicators at periodic time intervals, a relay individual to each switch and operatively connected to impart a predetermined advance to said switch upon each energization of the relay, all of said relays being electrically connected in parallel, electrical means in circuit with the relays and synchronized with and controlled by the recording means to simultaneously energize the relays at each recording time interval, a synchronizing circuit in series with each relay and said electrical means including a pair of closed contacts, a cam on each switch to open said contacts and disconnect the relay from the electrical means, and a multiple switch adapted to connect all of the relays directly to the electrical means when the aforesaid contacts have all opened.

9. In an apparatus for recording flight characteristics of an airplane including a plurality of series of measuring instruments, the instruments of each series being distributed to critical areas of the airplane and adapted to measure the same characteristic, a central station comprising an indicator for each series of instruments, a step-by-step switch for each series organized and arranged to individually connect each instrument of its series with the indicator of that series, a recording mechanism for simultaneously recording the readings of all of said indicators at periodic time intervals, means under the control of said recording mechanism to advance all of said switches in unison synchronously with each time interval of the recorder, and means for initially setting all of said switches at corresponding starting points.

WILLIAM V. BROWN.

REFERENCES CITED

The following references are of record in the file of this patent:

UNITED STATES PATENTS

| Number | Name | Date |
| --- | --- | --- |
| Re. 15,617 | Brewer | June 5, 1923 |
| 1,614,222 | White et al. | Jan. 11, 1927 |
| 2,264,623 | Dickinson | Dec. 2, 1941 |
| 2,330,980 | Leathers | Oct. 5, 1943 |
| 2,335,755 | Haddad | Nov. 3, 1943 |
| 2,387,760 | Keinath | Oct. 30, 1945 |
| 2,392,890 | Vincent et al. | Jan. 15, 1946 |
| 2,411,247 | Cohen | Nov. 19, 1946 |
| 2,414,976 | Redhed | Jan. 28, 1947 |
| 2,423,340 | Pellettere | July 1, 1947 |
| 2,426,947 | Potts | Sept. 2, 1947 |
| 2,427,355 | Keinath | Sept. 16, 1947 |
| 2,467,929 | Colt | Apr. 16, 1949 |